US010706857B1

(12) United States Patent
Ramasubramanian et al.

(10) Patent No.: US 10,706,857 B1
(45) Date of Patent: Jul. 7, 2020

(54) RAW SPEECH SPEAKER-RECOGNITION

(71) Applicants: Viswanathan Ramasubramanian, Karnataka (IN); Sunderrajan Kumar, Tamilnadu (IN)

(72) Inventors: Viswanathan Ramasubramanian, Karnataka (IN); Sunderrajan Kumar, Tamilnadu (IN)

(73) Assignee: KAIZEN SECURE VOIZ, INC., Edison, NJ (US)

( * ) Notice: Subject to any disclaimer, the term of this patent is extended or adjusted under 35 U.S.C. 154(b) by 0 days.

(21) Appl. No.: 16/852,950

(22) Filed: Apr. 20, 2020

(51) Int. Cl.
*G10L 17/18* (2013.01)
*G06N 3/04* (2006.01)
*G10L 17/10* (2013.01)

(52) U.S. Cl.
CPC .............. *G10L 17/18* (2013.01); *G06N 3/04* (2013.01); *G10L 17/10* (2013.01)

(58) Field of Classification Search
USPC .................... 704/232, 246, 247, 251, 252
See application file for complete search history.

(56) References Cited

U.S. PATENT DOCUMENTS

2018/0189215 A1* 7/2018 Boesch ............... G06F 9/44505
2019/0340314 A1* 11/2019 Boesch ................. G06F 30/327

OTHER PUBLICATIONS

Campbell, Joseph P., Jr.; Speaker Recognition: A Tutorial; Proceedings of the IEEE, vol. 85, No. 9, Sep. 1997, pp. 1437-1462.
Hansen, John H.L.; Hasan, Taufiq; Speaker Recognition by Machines and Humans: A tutorial review; Article in IEEE Signal Processing Magazine—Nov. 2015, pp. 74-99.
Dehak, Najim et al.; Front-End Factor Analysis for Speaker Verification; IEEE Transactions on Audio, Speech, and Language Processing, vol. 19, No. 4, May 2011; pp. 788-798.
Prince, Simon J.D. et al.; Probabilistic Linear Discriminant Analysis for Inferences; 2007.
Heigold, Georg et al.; End-to-End Text-Dependent Speaker Verification; 2016.
Variani, Ehsan et al.; Deep Neural Networks for Small Footprint Text-Dependent Speaker Verification; 2014 IEEE Int. Conf. on Acoustic, Speech & Signal Proc.; pp. 4080-4084.

(Continued)

*Primary Examiner* — Leonard Saint Cyr
(74) *Attorney, Agent, or Firm* — Walter J. Tencza, Jr.

(57) ABSTRACT

An apparatus including a multi time-frequency resolution convolution neural network module; a two dimensional convolution neural network layers module; and a discriminative fully-connected classifier layers module; wherein the multi time-frequency resolution convolution neural network module receives a raw speech signal from a human speaker and processes the raw speech signal to provide a first processed output in the form of multiple multi time-frequency resolution spectrographic feature maps; wherein the two dimensional convolution neural network layers module processes the first processed output to provide a second processed output; and wherein the discriminative fully-connected classifier layers module processes the second processed output to provide a third processed output, wherein the third processed output provides an indication of an identify of a human speaker or provides an indication of verification of the identify of a human speaker.

4 Claims, 4 Drawing Sheets

(56) References Cited

OTHER PUBLICATIONS

Richardson, Fred et al.; Deep Neural Network Approaches to Speaker and Language Recognition; IEEE Signal Proc. Ltrs, vol. 22, No. 10, Oct. 2015; pp. 1671-1675.
Lei, Yun et al.; A Novel Scheme for Speaker Recognition Using a Phonetically-Aware Deep Neural Network; 2014.
Zhang, Shi-Xiong et al.; End-to-End Attention Based Text-Dependent Speaker Verification; Jan. 3, 2017.
Synder, David et al.; Deep Neural Network-Based Speaker Embeddings for End-to-End Speaker Verification; ?? pub. date ??.
Garcia-Romero, Daniel et al.; Speaker Diarization Using Deep Neural Network Embeddings; 2017.
McLaren, Mitchell et al.; Application of Convolutional Neural Networks to Speaker Recognition in Noisy Conditions; Interspeech 2014, Sep. 14-18, 2014, Singapore pp. 686-690.
Zhang, Shi-Xiong et al.; End-to-End Attention Based Text-Dependent Speaker Verification; 2016 IEEE SLT; pp. 171-178.
Li, Chao et al.; Deep Speaker: an End-to-End Neural Speaker Embedding System; Baidu Inc.; May 5, 2017; pp. 1-8.
Zhang, Chunlei et al.; End-to-End Text-Independent Speaker Verification with Triplet Loss on Short Utterances; INTERSPEECH 2017; Aug. 2017, Sweden, pp. 1487-1491.
Chung, Joon Son et al.; VoxCeleb2: Deep Speaker Recognition, Jun. 27, 2018.
Salehghaffari, Hossein et al.; Speaker Verification using Convolutional Neural Networks; Aug. 10, 2018.
Hajibabaei, Mahdi et al.; Unified Hypersphere Embedding for Speaker Recognition; Jul. 22, 2018.
Wang, Mingshan et al.; Speaker Recognition using Convolutional Neural Network with Minimal Training Data for Smart Home Solutions; IEEE 2018; pp. 139-145.
Torfi, Amirsina et al.; Text-Independent Speaker Verification Using 3D Convolutional Neural Networks; Jun. 6, 2018.
Zhang, Chunlei; Text-Independent Speaker Verification Based on Triplet Conv. Neural Network Embeddings; IEEE/ACM Trans. on Audio, Speech, & Lang. Proc., vol. 26, No. 9, Sep. 2018.
Bhattacharya, Gautam et al.; Deep Speaker Recognition: Modular or Monolithic?; INTERSPEECH 2019, Sep. 2019, Austria; pp. 1143-1147.
Jiang, Yiheng et al.; An Effective Deep Embedding Learning Architecture for Speaker Verification; INTERSPEECH 2019, Sep. 2019, Austria, pp. 4040-4044.
Yadav, Sarthak et al.; Frequency and Temporal Convolutional Attention for Text-Independent Speaker Recognition; Oct. 19, 2019; India.
Muckenhirn et al.; Towards Directly Modeling Raw Speech Signal for Speaker Verification Using CNNs; Switzerland, IEEE ICASSP 2018, pp. 4884-4888.
Lecun, Y. et al.; Backpropagation Applied to Handwritten Zip Code Recognition; AT&T BEII Labs, Holmdel, NJ, Neural Computation, 1989, MIT; pp. 541-551.
Bengio, Yoshua et al.; Representation Learning: A Review and New Perspectives; IEEE Trans. on Pattern Analysis & Machine Intell., vol. 35, No. X, 2013, pp. 1-30.
Krizhevsky, Alex et al.; Image Net Classification with Deep Convolutional Neural Networks; Communications of the ACM; Jun. 2017, vol. 60, No. 6, pp. 84-90.
Abdel-Hamid, Ossama et al.; Convolutional Neural Networks for Speech Recognition; IEEE/ACM Trans. on Audio, Speech, & Lang. Proc., vol. 22, No. 10, Oct. 2014; pp. 1533-1545.
Hershey, Shawn et al.; CNN Architectures for Large-Scale Audio Classification; IEEE ICASP 2017; pp. 131-135.
Palaz, Dimitri et al.; Analysis of CNN-based Speech Recognition System using Raw Speech as Input; Switzerland; 2015; Facebook.
Sainath, Tara N. et al.; Learning the Speech Front-end With Raw Waveform CLDNNs; INTERSPEECH 2015; pp. 1-5; Google, Inc.
Dai, Wei, et al.; Very Deep Convolutional Neural Networks for Raw Waveforms; Oct. 1, 2016.
Tokozume, Yuji et al.; Learning Environmental Sounds With End-To-End Convolutional Neural Network; The University of Tokyo, Japan; 2017.
Lee, Jongpil, et al.; Sample-Level Deep Convolutional Neural Networks for Music Auto-Tagging Using Raw Waveforms; May 22, 2017.
Lee, Jongpil et al.; Sample CNN: End-to-End Deep Convolutional Neural Networks Using Very Small Filters for Music Classification; Appl. Sci. 2018, www.mdpi.com/journal/applsci.
Schindler, Alexander; Multi-Temporal Res. Convolutional Neural Networks for Acoustic Scene Class.; Detection and Classification of Acoustic Scenes & Events 2017, Germany.
Szegedy, Christian; Going Deeper with Convolutions; CVPR 2015; IEEE Xplore, pp. 1-9.
Zhu, Zhenyao et al., Learning Multiscale Features Directly From Waveforms; Apr. 5, 2016; Baidu Silicon Valley AI Lab; The Chinese University of Hong Kong.
Zhu, Boqing et al., Learning Environmental Sounds with Multi-scale Convolutional Neural Network; Mar. 25, 2018.
Zhu, Boqing, et al.; Environmental Sound Classification Based on Multi-Temporal Resolution Convolutional Neural Network Combining with Multi-level Features; Jun. 14, 2018; pgs.

\* cited by examiner

RAW SPEECH SPEAKER-RECOGNITION

FIELD OF THE INVENTION

This invention relates to methods and apparatuses concerning speaker recognition.

BACKGROUND OF THE INVENTION

Automatic Speaker recognition is the problem of recognizing the identity of a human speaker of a given speech signal of some specific duration by a machine. This problem falls into two broad categories: text-dependent and text-independent, depending on the dependence on whether the input speech signal is constrained to be from a specific text (e.g. a password text) or not constrained to be of any specific text, i.e., the speech signal can be of any text (content) in any language. In a different definition, speaker recognition comprises two different problems: speaker-identification and speaker-verification. The speaker-identification problem is a multi-class problem of having to determine the identity of the input speech signal as one of many speakers who are enrolled into a system. Speaker-verification is essentially a binary classification problem of determining whether the input signal is spoken by a claimed identity (of a speaker) or not—in the process yielding a Yes/No decision (i.e., of deciding whether the input signal is from the claimed identity (termed target speaker) or from a person other than the claimed identity—termed an impostor).

Traditionally, speaker recognition systems have been built using short-time acoustic feature vectors (typically, MFCCs (mel-frequency cepstral coefficients)) viewed as a bag-of-vectors framework, and designing GMM (Gaussian mixture model) based speaker modelling and GMM-UBM (GMM-Universal Background Model) based background speaker modelling as specified in J. P. Campbell. Speaker recognition: A tutorial. Proc. IEEE, vol. 85, no. 9, pp. 1437-1462, September 1997, and J. H. L. Hansen and T. Hasan. Speaker recognition by machines and humans: A tutorial review. IEEE Signal Process. Mag., vol. 32, no. 6, pp. 74-99, November 2015, which are incorporated by reference herein. In this approach, the background model (UBM Universal Background Model) is designed on a large set of speakers and adapted to a specific speaker (whether it is for speaker identification or speaker verification) to yield the speaker-specific GMM (Gaussian Mixture Model) via MAP (Maximum a-posteriori) adaptation techniques. Speaker-identification of a test signal is a multi-class classification problem, of deciding which of the N speaker models yields the highest likelihood of a test utterance (a collection of feature vectors). In speaker-verification, a likelihood ratio test yields the decision of whether the input test vectors are likely to be closer to claimant speaker (target) model or to the background model.

Alternately, in a progression from the above framework, the i-vector/PLDA (probabilistic linear discriminative analysis) approach evolved, which has yielded state-of-art performances for a long period of time (until now), and which has now been progressively replaced by end-to-end approaches. In the i-vector/PLDA (probabilistic linear discriminative analysis) approach, a super vector is extracted by stacking the mean vectors of the speaker-adapted GMM and projecting this super vector onto a total variability space to extract a low dimensional vector called the i-vector (identity vector) of that speaker as shown in Najim Dehak, Patrick J Kenny, Reda Dehak, Pierre Dumouchel and Pierre Ouellet. Front-end factor analysis for speaker verification. IEEE Transactions on Audio, Speech, and Language Processing, vol. 19, no. 4, pp. 788-798, 2011; and Simon J D Prince and James H Elder. Probabilistic linear discriminant analysis for inferences about identity. Proc. of International Conference on Computer Vision, 2007, which are incorporated by reference herein. Once such an i-vector is extracted as a 'representation' of the target speaker, a further discriminative modelling is done, such as the probabilistic linear discriminative analysis (PLDA) to handle channel or session variability. In the testing or verification stage, a decision as to whether the input test utterance is from the claimant speaker or not is made through the PLDA score or alternately, by computing the distance between the i-vectors extracted during the enrollment stage and the verification phase.

In summary, conventional techniques are based on:

(a) Short-term feature representation of the input speech signal, based on a spectral feature vector—namely the MFCCs (mel-frequency-cepstral-coefficients)—these are called hand-crafted features—as they are specified by signal processing techniques making use of prior knowledge of speech production/perception mechanisms.

(b) A speaker-GMM/background GMM-UBM modeling followed by likelihood based multi-class classification (for speaker-identification) and hypothesis—testing as a likelihood—ratio testing for speaker verification.

(c) An i-vector/PLDA approach as a further evolution from the above GMM-UBM approach being able to handle session—variability and channel—variability using results from joint-factor analysis.

There are several known prior art efforts towards designing deep-learning and end-to-end architectures for speaker-recognition, specifically, using the CNN (convolution neural network) framework as a front-end representation learning mechanism described as follows:

(1). Text-dependent speaker-verification results have been reported using deep neural networks (DNNs) and recurrent neural networks (RNNs) for speaker discriminative or phonetic discriminative network training; here, intermediate frame-level features such as d-vectors as disclosed in G. Heigold, I. Moreno, S. Bengio, and N. Shazeer. End-to-end text dependent speaker verification. Proc. IEEE Int. Conf. Acoust. Speech, Signal Process., 2016, pp. 5115-5119; and E. Variani, X. Lei, E. McDermott, I. L. Moreno, and J. Gonzalez-Dominguez. Deep neural networks for small footprint text-dependent speaker verification. Proc. IEEE Int. Conf. Acoust., Speech Signal Processing, 2014, pp. 4052-4056, which are incorporated by reference herein; bottleneck activations or phonetic alignments are extracted to formulate utterance-level speaker representations as disclosed in F. Richardson, D. Reynolds, and N. Dehak. Deep neural network approaches to speaker and language recognition. IEEE Signal Process. Lett., vol. 22, no. 10, pp. 1671-1675, October 2015; and Y. Lei, N. Scheffer, L. Ferrer, and M. McLaren. A novel scheme for speaker recognition using a phonetically-aware deep neural network. Proc. IEEE Int. Conf. Acoust., Speech Signal Process., 2014, pp. 1695-1699, incorporated by reference herein.

(2) DNNs (Deep Neural Networks), RNNs (Recurrent Neural Networks) and convolution neural networks (CNNs) with an end-to-end loss have been proposed to discriminate between the same-speaker and different-speaker pairs for global keyword (e.g., 'OK Google' and 'Hey Cortana') speaker verification tasks, and shown to achieve better performance compared with conventional techniques such as GMM-UBM or i-Vector/PLDA, G. Heigold, I. Moreno, S. Bengio, and N. Shazeer. End-to-end text dependent speaker verification. Proc. IEEE Int. Conf. Acoust. Speech, Signal Process., 2016, pp. 5115-5119; and S. Zhang, Z. Chen, Y. Zhao, J. Li, and Y. Gong. End-to-end attention based text-dependent speaker verification. Proc. IEEE Workshop Spoken Lang. Technol., 2016, pp. 171-178, incorporated by reference herein.

(3) Deep learning frameworks with end-to-end loss functions to train speaker discriminative embeddings include the work of Snyder et al. and Garcia et al. as disclosed in D. Snyder, P. Ghahremani, D. Povey, D. Garcia-Romero, Y. Carmiel and S. Khudanpur. Deep neural network based speaker embedding for end-to-end speaker verification. Proc. IEEE SLT, 2016; and D. Garcia-Romero, D. Snyder, G. Sell, D. Povey and A. McCree. Speaker diarization using deep neural network embeddings. Proc. IEEE Int. Conf. Acoust., Speech Signal Processing, 2017, pp. 4930-4934, incorporated by reference herein; who show that deep neural networks with an end-to-end similarity metric or DNN (Deep Neural Networks) based speaker embedding could outperform the i-Vector baselines.

(4) Several work—termed end-to-end realizations—actually start with a 'spectrogram' representation of the speech signal (derived via STFT (Short-time Fourier Transform) or mel filter bank (MFB) frame-level spectral representations) or a sequence of short-term feature vectors stacked in time followed by aggregation strategies to get a score over the entire duration of the input utterance, and perform deep CNN representation learning as disclosed in Mitchell McLaren, Yun Lei, Nicolas Scheffer, Luciana Ferrer, Application of convolutional neural networks to speaker recognition in noisy Conditions, Interspeech 2014, pp. 686-690, Singapore, 2014; Shi-Xiong Zhang, Zhuo Cheny, Yong Zhao, Jinyu Li and Yifan Gong, End-to-end attention based text-dependent speaker verification, Proc. IEEE SLT 2016, pp. 171-178, 2016; Chao Li, Xiaokong Ma, Bing Jiang, Xiangang Li, Xuewei Zhang, Xiao Liu, Ying Cao, Ajay Kannan and Zhenyao Zhu, Deep Speaker: an End-to-End Neural Speaker Embedding System, arXiv:1705.02304v1 [cs.CL] 5 May 2017; Chunlei Zhang, Kazuhito Koishida, End-to-End Text-Independent Speaker Verification with Triplet Loss on Short Utterances, Interspeech 17, pp. 1487-1491, Stockholm, Sweden, 2017; Joon Son Chungy, Arsha Nagraniy, Andrew Zisserman, VoxCeleb2: Deep Speaker Recognition, arXiv: 1806.05622v2 [cs.SD] 27 Jun. 2018; Hossein Salehghaffari, Speaker Verification using Convolutional Neural Networks, arXiv:1803.05427v2 [eess.AS] 10 Aug. 2018; Mandi Hajibabaei, Dengxin Dai, Unified hypersphere embedding for speaker recognition, arXiv: 1807.08312v1 [eess.AS] 22 Jul. 2018; Migshwan Wang et al., Speaker recognition using convolutional neural network with minimal training data for smart home solutions, pp. 139-145, 2018; Amirsina Torfi, Jeremy Dawson Nasser M. Nasrabadi, Text-independent speaker verification using 3D convolutional neural net-works, arXiv: 1705.09422v7 [cs.CV] 6 Jun. 2018; Chunlei Zhang, Kazuhito Koishida and John H. L. Hansen, Text-Independent Speaker Verification Based on Triplet Convolutional Neural Network Embeddings, IEEE/ACM Trans. on Audio, Speech and Language Processing, vol. 26, no. 9, pp. 1633-1644, September 2018; Gautam Bhattacharya, Jahangir Alam, Patrick Kenny, Deep Speaker Recognition: Modular or Monolithic?, Interspeech 19, pp. 1143-1147, Graz, Austria, 2019; Yiheng Jiang, Yan Song, Ian McLoughlin, Zhifu Gao, Lirong Dai, An Ef-fec-tive Deep Embedding Learning Architecture for Speaker Verification, Interspeech 19, pp. 4040-4044, Graz, Austria, 2019; and Sarthak Yadav, Atul Rai, Frequency and temporal convolutional attention for text-independent speaker recognition, arXiv:1910.07364v2 [cs.SD] 19 Oct. 2019; and all of the previous are incorporated by reference herein.

(5) Among the previous references, one work that distinguishes itself in being 'end-to-end' from a 'raw speech waveform' is that of Hannah Muckenhirn, Mathew Magimai-Doss, Sebastien Marcel. Towards directly modeling raw speech signal for speaker verification using CNNs. Proc. ICASSP 18, pp. 4884-4888, 2018, incorporated herein by reference, which proposes a CNN architecture for learning representations that are further processed for further SID (speaker identification) or SV (speaker verification). But this CNN architecture is a conventional CNN—though it proposes to work in a truly end-to-end manner from raw speech waveform, and employs two layers of convolutions—one 'followed' by the other in 'tandem' (i.e., as a cascade)—with each having different kernel sizes dictated more by the dimensions of the data involved in each layer. CNN architectures have been used in the prior art for a wide variety of problems, including other speech processing tasks (other than speaker-recognition) as shown as follows:

(i). Starting from the early introduction of the convolutional neural-network (CNN) by Le Cun disclosed in Y. LeCun et al. Backpropagation Applied to Handwritten Zip Code Recognition. Neural Computation, vol. 1, pp. 541-551, 1989; for successful recognition of handwritten digital images, CNNs have come to be a well-established framework for end-to-end approaches (i.e. from raw input), combining a powerful representational learning mechanism as disclosed in Y. Bengio, A. Courville, P. Vincent Representation Learning: A Review and New Perspectives. IEEE Transactions on Pattern Analysis and Machine Intelligence, vol. 35, issue 8, pp. 1798-1828, August 2013, incorporated herein by reference in its lower convolution layers and the discriminative fully-connected higher layers for multi-class classification tasks such as from raw images as disclosed in Alex Krizhevsky, Ilya Sutskever, Hinton, Geoffrey E. Hinton. ImageNet classification with deep convolutional neural networks Communications of the ACM. 60 (6): 8490, June 2017, incorporated herein by reference; audio/speech spectrographic images as disclosed in Ossama Abdel-Hamid, Abdel-rahman Mohamed, Hui Jiang, Li Deng, Gerald Penn and Dong Yu, Convolutional Neural Networks for Speech Recognition, IEEE/ACM Trans. on Audio, Speech and Language Processing, vol. 22, no. 10, pp. 1533-1545, October 2014; Shawn Hershey et al. CNN architectures for large-scale audio classification. Proc. ICASSP '17, New Orleans, 2017, incorporated herein by reference, speech-waveform as disclosed in D. Palaz, R. Collobert, R. Magimai-Doss, Analysis of CNN based speech recognition system using raw speech as input. Proc. Interspeech '15, Dresden, 2015; and Tara N. Sainath, Ron J. Weiss, Andrew W. Senior, Kevin W. Wilson and Oriol Vinyals Learning the speech front-end with raw waveform CLDNNs. Proc. Interspeech 15, Dresden, 2015 incorporated herein by reference; audio-waveform as disclosed in Wei Dai, Chia Dai, Shuhui Qu Juncheng Li Samarjit Da. Very deep convolutional neural networks for raw waveforms. Proc. ICASSP 17, New Orleans, L A, 2017; and Tokozume, Y., Harada, T. Learning environmental sounds with end-to-end convolutional neural network. Proc. ICASSP '17. New Orleans, L A, 2017, incorporated herein by reference; music-waveform as disclosed in Jongpil Lee, Jiyoung Park, Keunhyoung Luke Kim and Nam, Juhan. Sample-level deep convolutional neural networks for music auto-tagging using raw waveforms. Proc. 14th Sound and Music Computing Conference, pp. 220226, Espoo, Finland, 2016; and Jongpil Lee, Jiyoung Park, Keunhyoung Luke Kim and Juhan Nam. SampleCNN: End-to-End Deep Convolutional Neural Networks Using Very Small Filters for Music Classification. Appl. Sci., 8, 150, 2018, incorporated herein by reference.

(ii) A work that comes close to handling multi-scale properties disclosed in A. Schindler, T. Lidy, A. Rauber. Multi-temporal resolution convolutional neu-ral networks for acoustic scene classification. Detection and Classification of Acoustic Scenes and Events 2017, November 2017, Munich, Germany, incorporated herein by reference considers a 'parallel CNN architecture' with two branches with two different Two dimensional kernels, each designed to capture temporal and frequency relationship in an image-like 80×80 input of a log-amplitude transformed Mel-Spectrogram with 80 Mel-bands spectral and 80 STFT (Short-time Fourier Transform) frames temporal resolution. However, it does not directly address the issue of time-frequency trade-offs from raw one-dimensional waveform. Likewise, the recent work of Shawn Hershey et al. CNN architectures for large-scale audio classification. Proc. ICASSP '17, New Orleans, 2017, incorporated by reference herein applies a class of conventional CNN architectures for the audio-scene classification task for a comparative study with the input being log-mel spectrogram patches of 96×64 bins and not on raw waveforms.

Prior Art that Provides CNNs with Variable Kernel-Sizes.

The closest treatments in literature to the notion of using variable kernel sizes, are the following:

(a) In image-CNN literature: This is in the now well-known Inception network (or the GoogleNet) as disclosed in Christian Szegedy et al. Going Deeper with Convolutions. Proc. CVPR 2014, incorporated by reference herein, where multiple image kernels of sizes 1×1, 3×3 and 5×5 have been used in the initial CNN layers. However, the motivation for providing for these variable sized kernels has been very different from the fundamental time-frequency (spatial intensity variation vs spatial frequency in the case of images) trade-off.

(b) For automatic speech recognition (ASR): The work of Zhu et al. (2016) as disclosed in Zhenyao Zhu, Jesse H. Engel and Awni Hannun. Learning Multiscale Features Directly From Waveforms. arXiv:1603.09509v2 [cs.CL] 5 Apr. 2016, incorporated by reference herein, applies multiple kernel sizes in a multi-scale CNN architecture with the objective of performing a multi time-frequency resolution analysis for automatic speech recognition (ASR).

(c) For Audio scene classification (ASC): In a more recent work, disclosed in Boqing Zhu, Changjian Wang, Feng Liu, Jin Lei, Zengquan Lu, Yuxing Peng. Learning Environmental Sounds with Multi-scale Convolutional Neu-ral Network. Proc. IJCNN 2018, (also arXiv:1803.10219v1, March 2018); and Boqing Zhu, Kele Xu, Dezhi Wang, Lilun Zhang, Bo Li, Yuxing Peng, Environmental Sound Classification Based on Multi-temporal Resolution Convolutional Neural Network Combining with Multi-level Features. arXiv: 1805.09752v2, June 2018, incorporated by reference herein, addresses this issue and propose a multi-temporal architecture for audio-scene classification (ASC), taking into account the need for a variable time-frequency representational analysis of the one dimensional signal such as audio-signal for the ASC task.

CNNs with Variable Kernel 'Band-Widths'

In another variant of CNNs which allow variable-kernel 'bandwidths' (in the frequency domain, where the kernel is interpreted as a bandpass filter), [Ravanelli and Bengio, 2018, 2019] M. Ravanelli and Y. Bengio, "Speaker Recognition from raw waveform with SincNet", Proc. of SLT, 2018 and M. Ravanelli and Y. Bengio, "Interpretable Convolutional Filters with SincNet", 32nd Conference on Neural Information Processing Systems (NIPS 2018) IRASL workshop, Montréal, Canada, propose the 'SincNet'—which constrains the kernel to be a sinc function, parameterized by the lower and higher cut-off frequencies of the corresponding 'rectangular' bandpass filter. By this SincNet proposes to use up to 80 filters in a convolutional layer—each filter of fixed length in time-domain, but capable of learning variable band-width band-pass filters by making the lower- and higher-cutoff frequencies of the sinc function as the parameters to be learnt.

Various prior art in this domain can be outlined as follows:

(a) Prior-art of type one: Related to conventional approaches to speaker-recognition, namely, i) GMM-UBM and ii) i-vector/PLDA approaches.

(b) Prior art of type two: Related specifically to the use of CNN architectures (some of them presumably termed end-to-end) for 'speaker recognition' problems—as a recent progression from the above set of more conventional techniques.

(c) Prior art of type three: Related to the use of CNN architectures in various tasks.

(d) Prior art of type four: Related to specific CNN architectures that employ variable-sized kernels as we do here.

(e) Prior art of type five: Related to specific CNN architectures that employ variable-bandwidth (but fixed-sized) kernels.

SUMMARY OF THE INVENTION

One or more embodiments of the present application include solutions in a text-independent scenario and relate to speaker-identification and speaker-verification problems.

In at least one embodiment of the present application an apparatus is provided including a multi time-frequency resolution convolution neural network module having an input and an output; a two dimensional convolution neural network layers module having an input and an output; and a discriminative fully-connected classifier layers module having an input and an output.

The multi time-frequency resolution convolution neural network module may be configured to receive a raw speech signal from a human speaker at the input of the multi time-frequency resolution convolution neural network module; and to process the raw speech signal to provide a first processed output at the output of the multi time-frequency resolution convolution neural network module.

The two dimensional convolution neural network layers module may be configured to receive the first processed output at the input of the two dimensional convolution neural network layers module; and to process the first processed output to provide a second processed output at the output of the two dimensional convolution neural network layers module.

The discriminative fully-connected classifier layers module may be configured to receive the second processed output at the input of the discriminative fully-connected classifier layers module; and to process the second processed output to provide a third processed output at the output of the discriminative fully-connected classifier layers module.

In at least one embodiment of the present application one or more computer processors and one or more computer memories are provided for a combination of the multi time-frequency resolution convolution neural network module, the two dimensional convolution neural network layers module, and the discriminative fully-connected classifier layers module, to process the raw speech signal into the first processed output, to process the first processed output into the second processed output, and to process the second processed output into the third processed output, in accordance with computer software stored in the one or more computer memories as executed by the one or more computer processors.

In at least one embodiment of the present invention, the multi time-frequency resolution convolution neural network module processes the raw speech signal to provide a first processed output by performing a multi time-frequency analysis on a waveform of the raw speech signal using variable-sized kernels in a first convolution layer and thereby creating one or more feature maps that correspond to one or more spectrographs, each of the one or more spectrographs equivalent to a filter-bank analysis with variable kernel convolving filter sizes, wherein the one or more feature maps are the first processed output.

In at least one embodiment of the present invention the two dimensional convolution neural network layers module processes the first processed output to provide the second processed output by processing the first processed output of one or more feature maps generated by the first convolution layer of the multi time-frequency resolution convolution neural network as a stack of one or more spectrographs, and subjecting the stack of one or more spectrographs to max-pooling to reduce the stack of one or more spectrographs to a feature-map of constant size and further processed by one or more convolutional layers of the two dimensional convolution neural network layers module, viewing the stack of one or more spectrographs, as a volume of time-frequency data and applying a pipeline of four image convolutional neural network layers of the two dimensional convolution neural network on the stack of one or more spectrographs as a flattened image convolution, which results in a low dimensional embedding vector, which is flattened and which is provided as the second processed output.

In at least one embodiment of the present application the discriminative fully-connected classifier layers module processes the second processed output to provide a third processed output by performing a multi-class speaker-identification task by respectively yielding one or more posterior probabilities over one or more speaker classes.

In at least one embodiment of the present application, the discriminative fully-connected classifier layers module processes the second processed output to provide a third processed output by performing a two way speaker-verification task by respectively yielding one or more posterior probabilities over one or more target and non target speaker classes.

Alternatively, the discriminative fully-connected classifier layers module may process the second processed output to provide a third processed output by performing a multi-way speaker-identification task by yielding multiple posterior probabilities over multiple speaker classes; and the discriminative fully-connected classifier layers module may process the second processed output to provide a third processed output by performing a two way speaker-verification task by respectively yielding one or more posterior probabilities over one or more target and non target speaker classes.

At least one embodiment of the present application includes a method comprising receiving a raw speech signal from a human speaker; processing the raw speech signal by use of a computer processor in accordance with computer software stored in computer memory to provide a first processed output; processing the first processed output by use of a computer processor in accordance with computer software stored in computer memory to provide a second processed output; processing the second processed output by use of a computer processor in accordance with computer software stored in computer memory to provide a third processed output.

The raw speech signal may be processed to provide the first processed output, the first processed output may be processed to provide the second processed output, and the second processed output may be processed to provide the third processed output, as previously described, with reference to one or more embodiments of an apparatus of the present invention.

In at least one embodiment, the third processed output provides an indication of the identity of a human speaker. In at least one embodiment, the third processed output provides an indication of a verification of an identity of a human speaker.

The third processed output may generally be in the form of a set of probabilities (called posterior probabilities) one per speaker in the cases of multi-class speaker-identification, and a set of two probabilities—one for the target-speaker and one for the non-target speaker in the case of speaker-verification. The third processed output provides automatic speaker identification or automatic speaker verification. The third processed output are, in at least one embodiment, typically probabilities (posterior probabilities) for each speaker in the case of speaker-identification, each probability in the range of 0 to 1; the third processed output are, in at least one embodiment, typically probabilities (in the range of 0 to 1) for the target and non-target speakers in the case of speaker-verification.

In at least one embodiment the third processed output may be stored in computer memory and/or displayed on a computer monitor, which may be part of a provided overall apparatus. The third processed output may be used by one or more computer processors in accordance with computer software stored in computer memory, to decide which is the correct speaker as identified from a set of posterior probabilities in the case of speaker-identification; and the third processed output may be used by one or more computer processors in accordance with computer software stored in computer memory to decide whether an input speaker is a target speaker or non-target speaker from among the two posterior probabilities in the case of speaker-verification.

A further output may be provided and stored in computer memory and/or displayed on a computer monitor in accordance with computer software stored in computer memory and as executed by one or more computer processors to indicate the correct speaker and/or to indicate whether an input speaker is a target speaker or a non-target speaker. For example, the further output, as an example, may indicate that it is likely that "John Smith" is the name of the correct speaker, or if "John Smith" is the name of the target speaker, the further output may indicate that it is likely that the input speaker is the target speaker "John Smith" or likely that the input speaker is not the target speaker "John Smith".

DETAILED DESCRIPTION OF THE DRAWINGS

Figure 1:
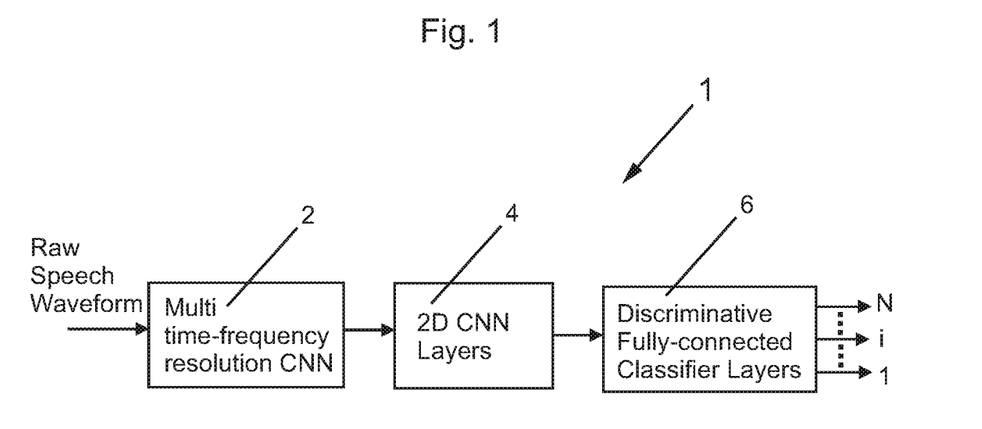
FIG. 1 is a simplified diagram of a pipe-line of a speaker-identification (SID) system in accordance with an embodiment of the present invention.

FIG. 1 is a simplified diagram of a pipe-line of a speaker-identification (SID) system in accordance with an embodiment of the present invention.

Figure 2:
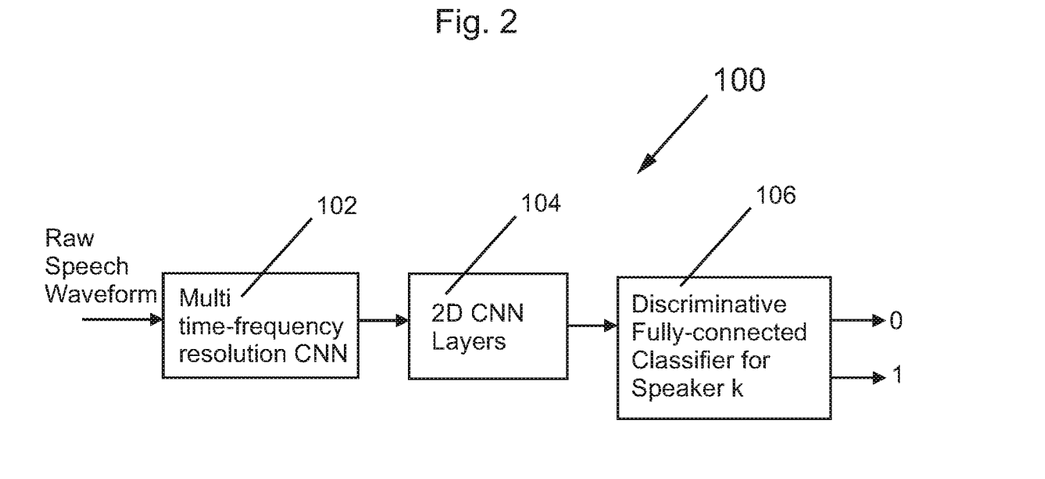
FIG. 2 is a simplified diagram of a pipe-line of a speaker-verification (SV) system, in accordance with an embodiment of the present application.

FIG. 2 is a simplified diagram of a pipe-line of a speaker-verification (SV) system, in accordance with an embodiment of the present application.

Figure 3:
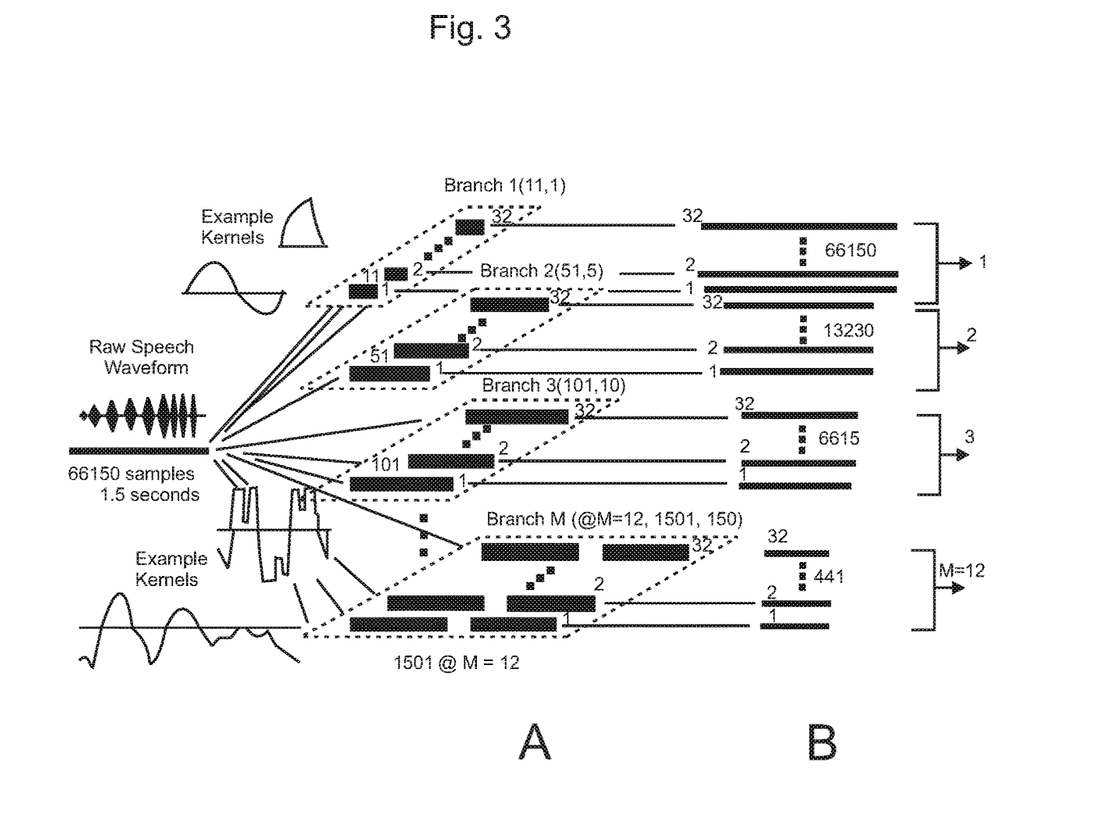
FIG. 3 is a simplified diagram of Multi-temporal CNN architecture—showing formation of multi time-frequency spectrographic feature maps.

FIG. 3 is a simplified diagram of Multi-temporal CNN architecture—showing formation of multi time-frequency spectrographic feature maps.

Figure 4:
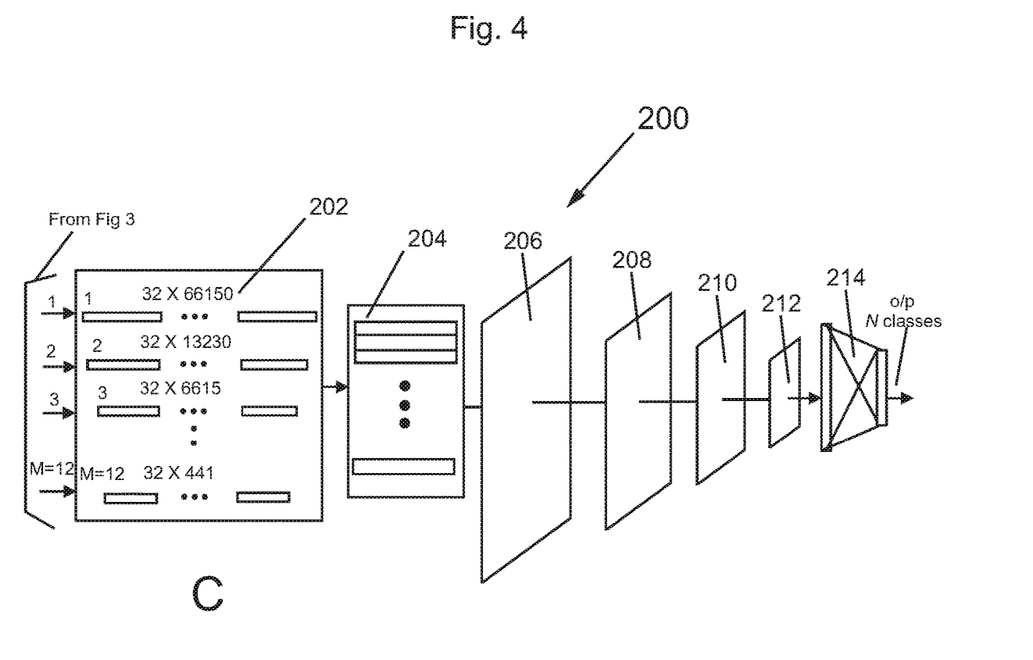
FIG. 4 is a simplified diagram of Multi-temporal CNN architecture—showing the pipe-line from multi time-frequency spectrographic feature maps to fully connected layers.

FIG. 4 is a simplified diagram of Multi-temporal CNN architecture—showing the pipe-line from multi time-frequency spectrographic feature maps to fully connected layers.

One or more embodiments of the present application provide a novel multi time-frequency resolution CNN architecture (referred to as 'multi-t-f CNN' in the present application) for end-to-end speaker-recognition (both multi-class speaker-identification and speaker-verification as in voice-bio-metric applications) from raw speech signal. Conventional CNNs use fixed size kernels with each kernel having a fixed time-frequency resolution (i.e., fixed duration impulse response and a fixed band-width frequency response) and an associated fixed time-frequency resolution trade-off. In contrast, in one or more embodiments of the present application a multi-t-f CNN architecture has multiple kernel branches (for example up to twelve) with variable sized kernels, allowing for multiple filter banks with different time-frequency resolutions to process the input raw signal and create spectrographic feature-maps corresponding to different time-frequency resolution trade-offs. This architecture offers potential enhancements in performance over other related architectures for speaker-recognition such as i) conventional GMM-UBM (Gaussian Mixture Model—Universal Background Model) or i-vector/PLDA or x-vector techniques given the advantage of deep learning architectures such as our proposal is based on, ii) CNN architectures working on spectrographic or short-term feature sequences with aggregation and iii) CNN architectures with tandem convolutional layers which cannot perform multi t-f resolution analysis.

One or more embodiments of the present invention provide a multi time-frequency (multi-t-f) CNN architecture in an end-to-end configuration, with emphasis on the ability of this new architecture to per-form enhanced representation learning from a one-dimensional speech signal and address the problem of speaker-recognition. This enhanced representation learning comes from the architecture's ability to perform a multi time-frequency analysis on the input waveform using variable-sized kernels in its first convolution layer and thereby create feature maps that correspond to multiple spectrographs, each equivalent to a filter-bank analysis with variable kernel (convolving filter) sizes.

Specifically, the present invention in at least one embodiment provides a novel architecture for these two problems (Speaker-identification and Speaker-verification), termed the 'multi time-frequency resolution CNN' (multi-t-f CNN) architecture to perform an efficient representation learning from a raw speech signal—thereby placing one or more embodiments of the present invention in the class of 'end-to-end speaker-recognition' from raw speech signal.

One or more embodiments of the present application related to a specific aspect of CNNs, namely, the kernel sizes used in the convolutional kernels, and provide that for applying CNNs on raw one-dimensional signals such as speech waveforms, it becomes important to 'provide' for a variable kernel size, to exploit and resolve the well-known time-frequency resolution trade-off inherent in such one-dimensional convolution (or windowed linear filtering) operation. While this applies to two-dimensional images also, this issue of having to address the time-frequency trade-off in the application of a filter-bank kind of operation (what a set of kernels in a CNN layer do) has been more or less overlooked in the image-CNN community.

One or more embodiments of the present application is different from various methods and apparatus of the prior art in being 'truly' end-to-end in the sense of working on raw speech waveforms and building a representation learning architecture that works on the raw signal to extract meaningful feature maps which are further discriminatively processed for the SID and SV tasks, as opposed to those in the prior art which work on spectrographic input or feature vector sequences already extracted from raw speech waveform in a so-called 'hand-crafted' manner).

Specifically, with respect to Hannah Muckenhirn, Mathew Magimai-Doss, Sebastien Marcel. Towards di-rectly modeling raw speech signal for speaker verification using CNNs. Proc. ICASSP 18, pp. 4884-4888, 2018 reference that prior work does indeed use a raw waveform for 'speaker-recognition' as is done in one or more embodiments of the present application. However, one or more embodiments of the present application is different from Hannah Muckenhirn, Mathew Magimai-Doss, Sebastien Marcel., in the sense of using 'parallel' variable-sized kernels operating on the 'same' in-put waveform 'simultaneously' to be able to perform a multi time-frequency resolution analysis and feature-map extraction. This is in direct contrast to the Hannah Muckenhirn, Mathew Magimai-Doss, Sebastien Marcel. Towards directly modeling raw speech signal for speaker verification using CNNs. Proc. ICASSP 18, pp. 4884-4888, 2018 reference which use two convolutional layers in 'tandem' i.e., one after the other, thus with the second layer operating on the output of the first layer, and thereby not equipped to perform a multi time-frequency analysis on the input waveform; i.e., in short, with respect to the Hannah Muckenhim reference, one or more embodiments of the present application differentiate in providing a radically different CNN architecture termed 'multi time-frequency resolution' analysis network using multiple-kernel sizes in parallel branches, as opposed to using different kernel sizes in a tandem manner as done in the Hannah Muckenhim reference. Such a multi time-frequency analysis, as we propose, arises only from such a 'parallel' branch application of kernels of different sizes directly on the input waveform and not from a tandem cascading of convolution layers even if they are with different kernel sizes.

With respect to prior art references Zhenyao Zhu, Jesse H. Engel and Awni Hannun. Learning Multiscale Features Directly From Waveforms. arXiv:1603.09509v2 [cs.CL] 5 Apr. 2016 and Boqing Zhu, Changjian Wang, Feng Liu, Jin Lei, Zengquan Lu, Yuxing Peng. Learning Environmental Sounds with Multi-scale Convolutional Neu-ral Network. Proc. IJCNN 2018, (also arXiv:1803.10219v1, March 2018) and Boqing Zhu, Kele Xu, Dezhi Wang, Lilun Zhang, Bo Li, Yuxing Peng, Environmental Sound Classification Based on Multi-temporal Resolution Convolutional Neural Network Combining with Multi-level Features. arXiv:1805.09752v2, June 2018 these references in a general sense use a type of multi branch CNN (convolution neural network) architecture, however the architectures used in these references differs from one or more embodiments of the present invention. In at least one embodiment of the present invention, a different and novel architecture is used, as in for example FIGS. 3 and 4, which typically has several branches with a wide variation in kernel sizes to deal with wide time-frequency variability that carries speaker saliency. In at least one embodiment of the present invention, a different and novel architecture, method, apparatus, and/or system, is embedded within a speaker-identification (SID) and a speaker-verification (SV) pipeline, as in FIGS. 1 and 2.

One or more embodiments of the present application, employing this novel and different architecture are applied, in at least one embodiment, to the task of 'speaker recognition' in contrast one or more of the above prior art references which apply a known architecture to ASR (automatic speech recognition), which generally relates to the content of a speech signal and not the identify of a speaker, and ASC (audio-scene classification), which generally relates to background or environmental sound, and not the identify of a speaker. There has been no other work along the lines provided by one or more embodiments of the present application, for identifying and verifying who is speaking.

As an important distinction with respect to prior art M. Ravanelli and Y. Bengio, "Speaker Recognition from raw waveform with SincNet", Proc. of SLT, 2018 and M. Ravanelli and Y. Bengio, "Interpretable Convolutional Filters with SincNet", 32nd Conference on Neural Information Processing Systems (NIPS 2018) IRASL workshop, Montréal, Canada, it should be noted that i) the SincNet approach at best produces a 'single' spectrographic feature-map, that is analyzed by variable bandwidth band-pass filters, resembling mostly a single mel-spaced filter-bank analysis, whereas, our proposed multi-t-f resolution CNN allows for multiple spectrographic feature maps to be learnt thus offering truly multi-t-f resolution of the input signal and ii) SincNet the way it is proposed, as a single convolutional layers, lacks parallel branches, and is not capable of analyzing the input signal content at various t-f resolutions across the entire t-f range, as can one or more embodiments of the present invention, which may be called "multi-t-f CNN".

In one or more embodiments of the present invention, the main pipeline of the SID and SV systems based on a multi time-frequency resolution CNN architecture, are as follows.

A pipeline for SID and SV using a multi t-f CNN architecture, in accordance with one or more embodiments of the present invention, is as follows.

FIG. 1 shows a diagram 1 of a pipeline of a speaker-identification (SID) system in accordance with an embodiment of the present invention. In FIG. 1, a raw speech waveform, typically from a human speaker is received at an input of a Multi time frequency resolution CNN module 2. The component 2 performs a representation learning in the form of multi-time-frequency resolution analysis of the input signal (whose mechanism is described in subsequent parts of the invention); and then provides an output in the form of a stack of multiple spectrographic feature maps each with a specific time-frequency resolution as determined by the kernel-sizes used in the Multi time frequency resolution CNN module 2, shown in FIG. 1, architecture as an input to the 2D (two dimensional) CNN layers module 4. The 2D CNN layers module 4 performs an image-like CNN operation on the stack of multi-time-frequency spectrographic feature maps and then provides an output flattened feature vector to Discriminative Fully-connected Classifier layers module 6. The discriminative full-connected classifier layers module 6 is programmed by computer software in a computer memory, executed by a computer processor to provide outputs as posterior probabilities on speaker identities 1, . . . , i, . . . , N which are subject to a argmax operation to yield the recognized speaker-identity or speaker-class of the speaker-identification system.

Each of the modules 2, 4, and 6 of FIG. 1, may include a computer processor and computer memory, with computer software in the computer memory, which is executed by the computer processor to implement processes in accordance with one or more embodiments of the present invention.

FIG. 2 shows a simplified diagram 100 of a pipeline of the speaker-verification (SV) system, in accordance with an embodiment of the present application. In FIG. 2, a raw speech waveform, typically from a human speaker is received at an input of a Multi time frequency resolution CNN module 102. The module 102 shown in FIG. 2, performs a representation learning in the form of multi-time-frequency resolution analysis of the input signal (whose mechanism is described in subsequent parts of the invention); and then provides an output in the form of a stack of multiple spectrographic feature maps each with a specific time-frequency resolution as determined by the kernel-sizes used in Component 2 architecture as an input to the 2D (two dimensional) CNN layers module 104. The module 104, is programmed by computer software, stored in computer memory, and executed by a computer processor to perform an image-like CNN operation on the stack of multi-time-frequency spectrographic feature maps and then provides an output of flattened feature vector to Discriminative Fully-connected Classifier for Speaker k module 106. The module 106 shown in FIG. 2 then provides outputs as the posterior probability of target speaker and non-target speaker, from which to yield an output of 0 or 1, which correspond to, respectively, non-target (impostor) and target speaker.

Each of components 102, 104, and 106 may include a computer processor and computer memory, with computer software in the computer memory, which is executed by the computer processor to implement processes in accordance with one or more embodiments of the present invention.

Both of the pipelines shown by FIG. 1 and FIG. 2, use a multi t-f CNN architecture, in accordance with an embodiment of the present invention, as front-end representation learning layers the output of which (at the output of component 2 and/or 102) is a set of spectrograph-like feature maps (time-frequency representation) stacked together—each derived from one branch of the multi-t-f CNN corresponding to one specific kernel size—capable of analyzing the input raw waveform in one specific time-frequency resolution (trade-off); multiple such branches (e.g. twelve), each with its own kernel size, thus performs a variable t-f resolution analysis on the input waveform and yield multiple (e.g. twelve) (output of components 2 and/or 102) spectrograph-like time-frequency feature maps, each with its unique time-frequency resolution trade-off and together comprising a joint representation of the input waveform in a very narrow-band to very wide-band kind of spectrographic stack. This is shown as output of the first block 'Multi time-frequency resolution CNN 2 and/or 102. This is further processed by a 2D CNN layers 4 and/or 104 viewing the stack as a volume of t-f (time frequency) data, further applying conventional CNNs on such a stack as a flattened image convolution. The result of this second stage CNN, which is a low dimensional embedding output, is further fed to a discriminative fully-connected classifier layer 6 and/or 106 (typically a MLP (Multi-Layer Perceptron) (or DNN (Deep Neural Network) which can perform either a multi-class (N-way) SID task or a 2-way SV task.

When the SID system, method, and/or apparatus of one or more embodiments of the present application, is used in a N-way SID task, the system is trained on supervised data of raw waveforms from each of the speakers and with a cross-entropy kind of loss function between the posterior vector output by the network (output of Discriminative Fully-Connected Classifier Layers 6 6 in FIG. 1) and an one-hot encoded vector representation of each target speaker. In the case of SV, shown in FIG. 2, task, the pipe-line is configured in at least one embodiment to be trained for a particular speaker 'k' (in its discriminative layer 106) to perform a target/non-target two-way classification, when trained on such target/non-target pairs of data, typically using loss-functions that reflect cross-entropy or triplet-loss kind of scenarios.

During testing, for SID, the input raw waveform x is classified as the class j by maximum a-posteriori (MAP) rule applied on the posterior probabilities $p(i|x)$, $i=1, \ldots, N$ available at the output of discriminative fully-connected classifier layers 6 in FIG. 1 of the particular pipe-line. For SV, in FIG. 2, the input raw speech waveform, along with the claimant speaker identity k, uses a pipe-line with the discriminative classifier 106 trained for speaker k 106, to yield a posterior $p(1|x)$ and $p(0|x)$, from which to make a decision of target/non-target speaker—optionally, in at least one embodiment from a likelihood ratio test—between these two posteriors, and using a threshold that is trained for EER (Equal-Error-Rate) or a specific DCF (Decision Cost Function) based operating point.

One or more embodiments of the present invention provide an apparatus, method, and system which may be called a multi time-frequency resolution CNN (or multi-t-f CNN). In at least one or more embodiment of the present application, the multi time-frequency resolution CNN is employed in both the pipelines FIG. 1 or FIG. 2 in modules 2 and 102, respectively.

FIG. 1: Pipeline of a multi time-frequency (multi-t-f) CNN apparatus, method, and/or system a) Top: Speaker-Identification (SID) and b) Bottom: Speaker-Verification (SV)

Multi Time-Frequency Resolution (Multi-t-f) CNN Architecture

The multi-temporal CNN architecture of one or more embodiments of the present invention is as shown in FIG. 3. a) Formation of the multi time-frequency spectrographic feature maps and b) From the feature maps to fully connected layers.

FIG. 3 is critical in one or more embodiments of the present application—namely, the multi-branch CNN architecture capable of processing the raw one-dimensional signal input (speech signal) to create multiple spectrographic feature maps with a wide range of time-frequency resolution trade-offs. It can be seen that the input raw signal (shown as 1.5 sec duration here in FIG. 3), made of 66,150 samples corresponding to a sampling rate of 44.1 kHz (kilohertz), is fed to M branches, each with a set of 32 kernels, with each branch having a fixed kernel size (e.g. branch 1 has kernel sizes of 11 samples, branch 2 has kernel sizes fifty-one and so on). One or more embodiments of the present invention provide this work M, number of branches up to 12.

Multi-temporal CNN architecture—FIG. 3 formation of multi time-frequency spectrographic feature maps, FIG. 4 pipeline showing the processing from multi time-frequency spectrographic feature maps to fully connected layers i.e. 12 branches, with $M=12^{th}$ branch having the longest kernels of size 1501 samples.

To provide a reference, a conventional CNN has only one branch (with multiple kernels, e.g. thirty-two here), with some fixed size kernel size, e.g. fifty-one (in the second branch). In such a conventional CNN branch, each kernel convolves with the one-dimensional signal input and yields an output that is a linearly filtered version of the signal through each of the thirty-two kernels in that branch. As the CNN learns to map the input to the classes in the fully connected layer in the output, the kernels (the filter coefficients) are optimized to learn to extract an appropriate feature signal from the input signal, and create a 'feature map' which is one spectrogram-like output made of thirty-two channels each with its time varying filter outputs. This 'single' spectrogram is governed by the time-frequency resolution trade-off inherent and defined by the kernel size (of the single branch).

The resultant spectrogram-like feature map can be viewed as a narrow-band or wide-band spectrogram depending on the kernel size, i.e., small kernels yielding high temporal resolution and poor frequency resolution resulting in a wide-band spectrogram and long kernels yielding poor temporal resolution and very good frequency resolution resulting in a narrow-band spectrogram. This can also be viewed as equivalent to a filter-bank analysis of the input signal with the filter-banks' filter's spectral characteristics—the band-pass bandwidths determined by the kernel size and the frequency response determined by the kernel values—which in turn are determined by the CNN's weight learning for the given task.

It is clear that such a 'single' branch and the corresponding spectrogram with a time-frequency trade-off specific to the kernel size of that branch is highly restricted in the kind of time-frequency analysis it can perform on the input 1-d signal. For instance, in a wide class of one dimensional signal classification problems, the signal is highly non-stationary with the spectral dynamics changing at varying rates in time, and with various spectral events localized in frequency likewise exhibiting different temporal evolutions. In order to capture these dynamic events in time and frequency, localized at different scales in time and frequency, a single spectrographic representation as obtained by a single branch CNN is clearly inadequate. This calls for a mechanism to generate time-frequency representations at different time-frequency resolutions, that is made possible by considering multiple branches in the CNN, each branch with a pre-specified but variable kernel size which is same for all the kernels in that branch.

FIG. 3 shows such a multi-branch CNN in section marked 'A', with up to M branches. Shown are branches 1, 2 and 3 and M=12, with the corresponding kernel sizes 11, 51, 101, 151, 201, 251, 301, 501, 601, 751, 1001 and 1501. Such a multi-branch CNN will generate a spectrographic feature-map in 'each' of the M branches, each such feature map having its unique time-frequency trade-off determined by the kernel size used in the corresponding branch. For example, here, Branch 1 with kernel size 11 eleven samples, will yield a very wide-band spectrogram (with a very fine time-resolution and poor frequency resolution), Branch 2 with kernel size 51 samples will yield a less wide-band spectrogram, Branch 3 with a kernel size 101 samples will yield a narrow-band spectrogram, and Branch M=12 with a very long kernel size 1501 samples will yield a very narrow-band spectrogram (with a poor time-resolution and very good frequency resolution). Thus the M branches taken together will yield multi-temporal time-frequency resolution spectrographic feature maps (as shown in the sections marked 'B' and 'C' in this figure), each of size 32 frequency channels×number of filter outputs decided by the stride of the convolution kernel in that branch (e.g. 32×6615 for Branch 3 with stride of 10).

The feature maps in 'C' are a stack of M individual spectrographic maps, each of length (66150, 13250, 6615, ..., 441) corresponding to the M branches, and each of these are subject to max-pooling to reduce them to a feature-map of size M×32×441 or 384×441 for M=12. This is shown in FIG. 4. The feature map stack in 'C', on being reduced to a feature-map of size 384×441 for M=12 is further processed by 4 convolutional layers, each with 64, 128, 256 and 256 filters—each filter being a 3×3 kernel with a stride 1×1, yielding respectively 64 (128×40), 128 (64× 20), 256 (32×10) and 256 (16×5) feature maps on suitable max-pooling at each stage.

The final output of size 256×16×5 from the fourth convolution layer is used directly as input to the fully connected layer with an output layer with N soft-max outputs (corresponding to N classes, e.g. N speakers for Speaker-identification (SID) task or N=2 for Speaker-verification (SV) task. The feature map stack in 'C' (and forming the input of 384×441) represents the joint feature map across the multi-temporal multi time-frequency resolution spectrographic feature maps (multi time-frequency textures in the stack representing the input raw audio/speech waveform) and captures the different time-frequency event localizations that would be present in the input 1-d speech signal.

In at least one or more embodiments of the present application, the performance of the proposed architecture pipeline is superior to all prior art Type One e.g. of J. P. Campbell; J. H. L. Hansen et al.; Najim Dehak et al.; and Simon J D Prince et al. and Type Two, Type Three, Type Four and Type Five, for at least the following reasons:

(a) Deep learning architectures are superior to those in Conventional Speaker Recognition by GMM-UBM and i-vectors/PLDA methods.—. By this account, the architecture of one or more embodiments of the present application—being a deep CNN architecture is expected to outperform classical methods of GMM-UBM and i-vector/PLDA techniques—particularly for short-utterances for which these prior-art techniques are known to offer poor performances.

(b) Most deep learning architectures are based on 'handcrafted' features (spectrographic representations or feature vector sequences). It is well established that representation learning architectures working on the waveform directly offer enhanced performance over such hand-crafted features. Thus, one or more embodiments of the present invention are expected to offer improved performances over those in hand-crafted deep-learning techniques (c) With respect to Hannah Muckenhirn, Mathew Magimai-Doss, Sebastien Marcel. Towards directly modeling raw speech signal for speaker verification using CNNs. Proc. ICASSP 18, pp. 4884-4888, 2018 reference, one or more embodiments of the present application utilize a 'parallel' variable-sized kernel CNN layers, which perform multi time-frequency resolution analysis on the input waveform, whereas Hannah Muckenhirn, Mathew Magimai-Doss, Sebastien Marcel. Towards directly modeling raw speech signal for speaker verification using CNNs. Proc. ICASSP 18, pp. 4884-4888, 2018 does not do this and hence does not have this advantage.

(d) With respect to Zhenyao Zhu, Jesse H. Engel and Awni Hannun. Learning Multiscale Features Directly From Waveforms. arXiv:1603.09509v2 [cs.CL] 5 Apr. 2016 and Boqing Zhu, Changjian Wang, Feng Liu, Jin Lei, Zengquan Lu, Yuxing Peng. Learning Environmental Sounds with Multiscale Convolutional Neu-ral Network. Proc. IJCNN 2018, (also arXiv:1803.10219v1, March 2018) and Boqing Zhu, Kele Xu, Dezhi Wang, Lilun Zhang, Bo Li, Yuxing Peng, Environmental Sound Classification Based on Multi-temporal Resolution Convolutional Neural Network Combining with Multi-level Features. arXiv:1805.09752v2, June 2018, these are meant for ASR and ASC—completely different tasks, and no direct comparison is relevant or possible.

(e) With reference to the SincNet based speaker-recognition of M. Ravanelli and Y. Bengio, "Speaker Recognition from raw waveform with SincNet", Proc. of SLT, 2018 and M. Ravanelli and Y. Bengio, "Interpretable Convolutional Filters with SincNet", 32nd Conference on Neural Information Processing Systems (NIPS 2018) IRASL workshop, Montréal, Canada, we note that the proposed invention is expected to be superior to the SincNet based approach for the following reasons: i) the SincNet approach at best produces a 'single' spectrographic feature-map, that is analyzed by variable bandwidth band-pass filters, resembling mostly a 'single' mel-spaced filter-bank analysis, whereas, our proposed multi-t-f resolution CNN allows for multiple spectrographic feature maps to be learnt thus offering truly multi-t-f resolution of the input signal and ii) SincNet the way it is proposed, as a single convolutional layers, lacks parallel branches, and is not capable of analyzing the input signal content at various t-f resolutions across the entire t-f range, as our proposed invention multi-t-f CNN for speaker-recognition does.

One or more embodiments of the present application provide a novel multi time-frequency resolution (or simply multi-t-f) CNN architecture for end-to-end speaker-recognition (both multi-class speaker-identification and speaker-verification as in voice-biometric applications) from raw speech signal. In one or more embodiments the multi-t-f CNN architecture has multiple kernel branches (e.g. up to twelve) with variable sized kernels, allowing for multiple filter banks with different time-frequency resolutions to process the input raw signal and creates spectrographic feature-maps corresponding to different time-frequency resolution trade-offs. This architecture, in one or more embodiments, offers potential enhancements in performance over other related architectures for speaker-recognition such as i) conventional GMM-UBM or i-vector/PLDA or x-vector techniques given the advantage of deep learning architectures such as our proposal is based on, ii) CNN architectures working on spectrographic or short-term feature sequences with aggregation and iii) CNN architectures with tandem convolutional layers which cannot perform t-f resolution analysis.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:
1. An apparatus comprising:
a multi time-frequency resolution convolution neural network module having an input and an output;
a two dimensional convolution neural network layers module having an input and an output;
a discriminative fully-connected classifier layers module having an input and an output;
wherein the multi time-frequency resolution convolution neural network module is configured to receive a raw speech signal from a human speaker at the input of the multi time-frequency resolution convolution neural network module;
wherein the multi time-frequency resolution convolution neural network module is configured to process the raw speech signal to provide a first processed output at the output of the multi time-frequency resolution convolution neural network module;
wherein the two dimensional convolution neural network layers module is configured to receive the first processed output at the input of the two dimensional convolution neural network layers module;
wherein the two dimensional convolution neural network layers module is configured to process the first processed output to provide a second processed output at the output of the two dimensional convolution neural network layers module;
wherein the discriminative fully-connected classifier layers module is configured to receive the second processed output at the input of the discriminative fully-connected classifier layers module;
wherein the discriminative fully-connected classifier layers module is configured to process the second processed output to provide a third processed output at the output of the discriminative fully-connected classifier layers module;
wherein one or more computer processors and one or more computer memories are provided for a combination of the multi time-frequency resolution convolution neural network module, the two dimensional convolution neural network layers module, and the discriminative fully-connected classifier layers module, to process the raw speech signal into the first processed output, to process the first processed output into the second processed output, and to process the second processed output into the third processed output, in accordance with computer software stored in the one or more computer memories as executed by the one or more computer processors;
wherein the multi time-frequency resolution convolution neural network module processes the raw speech signal to provide a first processed output by performing a multi time-frequency analysis on a waveform of the raw speech signal using variable-sized kernels in a first convolution layer and thereby creating one or more feature maps that correspond to one or more spectrographs, each of the one or more spectrographs equivalent to a filter-bank analysis with variable kernel convolving filter sizes, wherein the one or more feature maps are the first processed output;
wherein the two dimensional convolution neural network layers module processes the first processed output to provide the second processed output by processing the first processed output of one or more feature maps generated by the first convolution layer of the multi time-frequency resolution convolution neural network as a stack of one or more spectrographs, and subjecting the stack of one or more spectrographs to max-pooling to reduce the stack of one or more spectrographs to a feature-map of constant size and further processed by one or more convolutional layers of the two dimensional convolution neural network layers module, viewing the stack of one or more spectrographs, as a volume of time-frequency data and applying a pipeline of four image convolutional neural network layers of the two dimensional convolution neural network on the stack of one or more spectrographs as a flattened image convolution, which results in a low dimensional embedding vector, which is flattened and which is provided as the second processed output; and
wherein the discriminative fully-connected classifier layers module processes the second processed output to provide a third processed output by performing a multi-class speaker-identification task by respectively yielding one or more posterior probabilities over one or more speaker classes.

2. An apparatus comprising:
a multi time-frequency resolution convolution neural network module having an input and an output;
a two dimensional convolution neural network layers module having an input and an output;
a discriminative fully-connected classifier layers module having an input and an output;
wherein the multi time-frequency resolution convolution neural network module is configured to receive a raw speech signal from a human speaker at the input of the multi time-frequency resolution convolution neural network module;
wherein the multi time-frequency resolution convolution neural network module is configured to process the raw speech signal to provide a first processed output at the output of the multi time-frequency resolution convolution neural network module;
wherein the two dimensional convolution neural network layers module is configured to receive the first processed output at the input of the two dimensional convolution neural network layers module;
wherein the two dimensional convolution neural network layers module is configured to process the first processed output to provide a second processed output at the output of the two dimensional convolution neural network layers module;
wherein the discriminative fully-connected classifier layers module is configured to receive the second processed output at the input of the discriminative fully-connected classifier layers module;
wherein the discriminative fully-connected classifier layers module is configured to process the second processed output to provide a third processed output at the output of the discriminative fully-connected classifier layers module;
wherein one or more computer processors and one or more computer memories are provided for a combination of the multi time-frequency resolution convolution neural network module, the two dimensional convolution neural network layers module, and the discriminative fully-connected classifier layers module, to process the raw speech signal into the first processed output, to process the first processed output into the second processed output, and to process the second processed output into the third processed output, in accordance with computer software stored in the one or more computer memories as executed by the one or more computer processors;

wherein the multi time-frequency resolution convolution neural network module processes the raw speech signal to provide a first processed output by performing a multi time-frequency analysis on a waveform of the raw speech signal using variable-sized kernels in a first convolution layer and thereby creating one or more feature maps that correspond to one or more spectrographs, each of the one or more spectrographs equivalent to a filter-bank analysis with variable kernel convolving filter sizes, wherein the one or more feature maps are the first processed output;

wherein the two dimensional convolution neural network layers module processes the first processed output to provide the second processed output by processing the first processed output of one or more feature maps generated by the first convolution layer of the multi time-frequency resolution convolution neural network as a stack of one or more spectrographs, and subjecting the stack of one or more spectrographs to max-pooling to reduce the stack of one or more spectrographs to a feature-map of constant size and further processed by one or more convolutional layers of the two dimensional convolution neural network layers module, viewing the stack of one or more spectrographs, as a volume of time-frequency data and applying a pipeline of four image convolutional neural network layers of the two dimensional convolution neural network on the stack of one or more spectrographs as a flattened image convolution, which results in a low dimensional embedding vector, which is flattened and which is provided as the second processed output;

wherein the discriminative fully-connected classifier layers module processes the second processed output to provide a third processed output by performing a multi-way speaker-identification task by yielding multiple posterior probabilities over multiple speaker classes; and wherein the discriminative fully-connected classifier layers module processes the second processed output to provide a third processed output by performing a two way speaker-verification task by respectively yielding one or more posterior probabilities over one or more target and non target speaker classes.

3. A method comprising:

receiving a raw speech signal from a human speaker;

processing the raw speech signal by use of a computer processor in accordance with computer software stored in computer memory to provide a first processed output;

processing the first processed output by use of a computer processor in accordance with computer software stored in computer memory to provide a second processed output;

processing the second processed output by use of a computer processor in accordance with computer software stored in computer memory to provide a third processed output;

wherein the raw speech signal is processed to provide the first processed output by performing a multi time-frequency analysis on a waveform of the raw speech signal using variable-sized kernels in a first convolution layer and thereby creating one or more feature maps that correspond to one or more spectrographs, each of the one or more spectrographs equivalent to a filter-bank analysis with variable kernel convolving filter sizes, wherein the one or more feature maps are the first processed output;

wherein the first processed output is processed to provide the second processed output by processing the one or more feature maps of the first processed output as a stack of one or more spectrographs, and subjecting the stack of one or more spectrographs to max-pooling to reduce the stack of one or more spectrographs to a feature-map of constant size and then the feature-map of constant size is further processed by one or more convolutional layers, viewing the stack of one or more spectrographs, as a volume of time-frequency data and applying a pipeline of four image convolutional neural network layers on the stack of one or more spectrographs as a flattened image convolution, which results in a low dimensional embedding vector, which is flattened and which is provided as the second processed output; and wherein the second processed output is processed to provide the third processed output by performing a multi-class speaker-identification task on the second processed output by respectively yielding one or more posterior probabilities over one or more speaker classes.

4. A method comprising receiving a raw speech signal from a human speaker;

processing the raw speech signal using a computer processor in accordance with computer software stored in computer memory to provide a first processed output;

processing the first processed output using a computer processor in accordance with computer software stored in computer memory to provide a second processed output;

processing the second processed output in accordance with computer software stored in computer memory to provide a third processed output;

wherein the raw speech signal is processed to provide the first processed output by performing a multi time-frequency analysis on a waveform of the raw speech signal using variable-sized kernels in a first convolution layer and thereby creating one or more feature maps that correspond to one or more spectrographs, each of the one or more spectrographs equivalent to a filter-bank analysis with variable kernel convolving filter sizes, wherein the one or more feature maps are the first processed output;

wherein the first processed output is processed to provide the second processed output by processing the one or more feature maps of the first processed output as a stack of one or more spectrographs, and subjecting the stack of one or more spectrographs to max-pooling to reduce the stack of one or more spectrographs to a feature-map of constant size and then the feature-map of constant size is further processed by one or more convolutional layers, viewing the stack of one or more spectrographs, as a volume of time-frequency data and applying a pipeline of four image convolutional neural network layers on the stack of one or more spectrographs as a flattened image convolution, which results in a low dimensional embedding vector, which is flattened and which is provided as the second processed output; and wherein the second processed output is processed to provide the third processed output by performing a two way speaker-verification task by respectively yielding one or more posterior probabilities over one or more target and non-target speaker classes.

* * * * *